Aug. 21, 1928.
T. F. KEARNEY
TIRE GAUGE
Filed Nov. 2, 1926
1,681,771
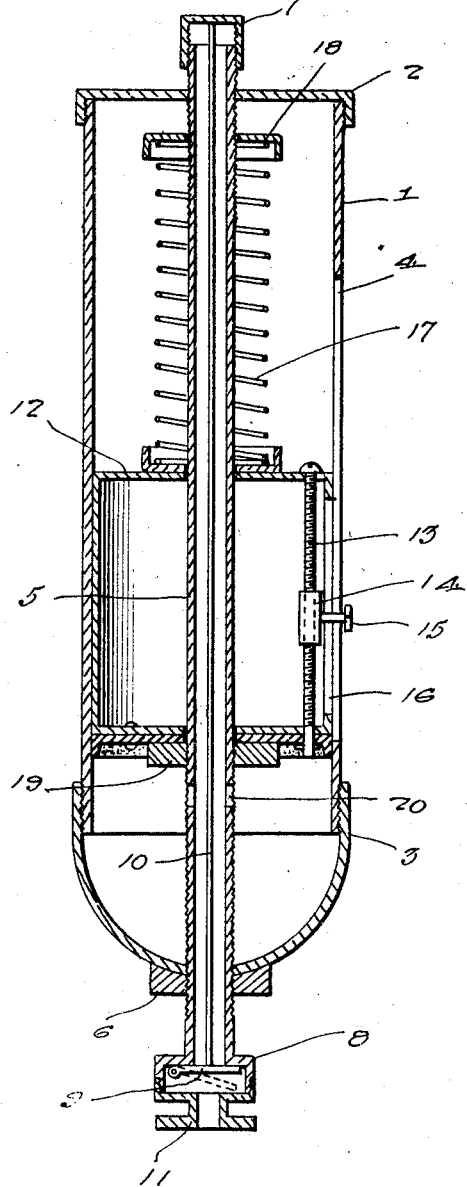
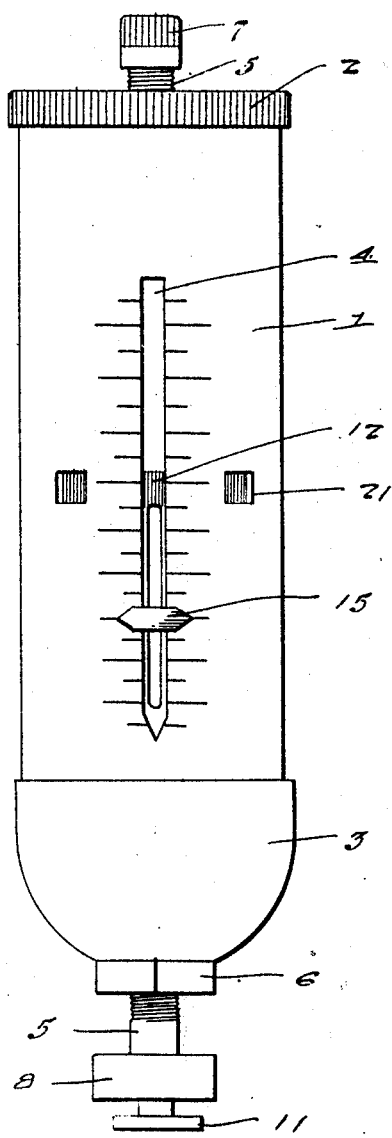
Inventor
T. F. Kearney
By Clarence A O'Brien
Attorney Patented Aug. 21, 1928.

1,681,771

UNITED STATES PATENT OFFICE.

THOMAS F. KEARNEY, OF SHARON, PENNSYLVANIA.

TIRE GAUGE.

Application filed November 2, 1926. Serial No. 145,822.

This invention relates to an improved air pressure gauge which is especially but, not necessarily, adapted for use in connection with automobile tire valves.

The invention has more particular reference to a structure of this kind which is constructed to permit it to be connected with the valve or directly with the inner tube in order that it may take the place of the valve.

Briefly, the invention has reference to a cylinder having a tube extending through and beyond the opposite ends thereof, there being a valve at one end of the tube, means for connecting the valved end to said inner tube, and a closing cap at the opposite end, together with a spring pressed piston in the cylinder carrying an indicator for cooperation with graduations on the exterior of the cylinder for indicating the pressure in said inner tube.

The invention is characterized by simplicity of construction, compactness and convenience of arrangement of parts, and efficiency in construction and use.

Other features and advantages of the invention will become apparent from the following description and drawings.

In the accompanying drawings forming a part of this application and in which like numerals are employed to designate like parts throughout the same:—

Figure 1 is a side elevation of a gauge constructed in accordance with the invention, Fig. 2 is a longitudinal sectional view thru the same.

Referring to the drawings in detail, it will be seen that the cylinder comprises an open ended cylindrical shell 1 having a removable cover plate 2 on one end and a removable cup 3 on its lower end. Formed in one side and between its ends is an elongated slot 4 having cooperating graduations formed on the edges thereof as shown in Fig. 1.

The tube is represented by the reference character 5 and this extends through and beyond the ends of the cylinder, the extending portions being screw threaded and there being a nut 6 on one screw threaded portion, and a removable cap 7 on the other. The first named end portion is constructed as at 8 to form a housing for a flap valve 9 having an operating stem 10.

A suitable fitting 11 is provided and is constructed for connection to the automobile inner tube. It will be noticed that the valve stem 10 extends through the upper end of the tube 5 and engages the cap 7. Obviously, when pressure is in the inner tube, it serves to hold the valve 9 closed and the stem 10 engaged with the cap 7. However, by threading the cap downwardly, the valve can be opened against the air pressure.

It is also true that in order to permit air to be placed in the inner tube the cap 7 must be removed and replaced by the inflation head on the supply hose (not shown).

A hollow piston is slidably mounted upon the tube 5 and is fitted snugly into the cylinder. On one side is a threaded bolt 13 upon which a sleeve 14 is adjustably mounted and this sleeve carries an indicator 15 for cooperation with the aforesaid graduations. The stem of the indicator extends through the slot 16 in the piston and also through the slot 4 in the cylinder. A coiled spring 17 surrounds the tube 5, bears at one end against the upper end of the piston 12 and at its opposite end against a shoulder 18 carried by the tube. The opposite end of the piston bears upon a nut 19 carried by the threaded lower end portion of the tube 5.

Just below the nut are air ports 20. In the form of the invention illustrated in the drawings, the construction is such as to permit the device to be made a permanent part of the inner tube. However, it might well be made in the form of an attachment to go on the ordinary inflation valve. Assuming that the device is in place on the inner tube, it will be seen that by removing the cap 7, and replacing it with the usual hose inflation head, a quantity of air will be supplied through the tube 5 in a manner to open the valve 9 and inflate the inner tube.

The back pressure will build up in the chamber formed in the lower portion of the cylinder by escaping through the port 20 and will operate the piston 12 to in turn operate the indicator 15 to show the approximate degree of pressure then, in the tube. As soon as the valve stem 10 is released the valve 9 will close.

It is believed that by considering the description in connection with the drawings, a clear understanding of the invention will be had. Therefore, a more lengthy description is thought unnecessary.

While the preferred embodiment of the invention has been shown and described, it is to be understood that minor changes coming within the field of invention claimed may be resorted to if desired.

Attention is here directed to the fact that the upper end portion of the cylinder 12 is preferably painted or otherwise colored with red, and windows 21 are provided on opposite sides of the slots 4 to expose this red band therethrough for the purpose of indicating when the pressure in the inner tube is dangerously low.

Having thus described my invention what I claim as new is:—

In a pressure gauge a slotted cylinder, a spring pressed piston slidably mounted in said cylinder, an adjusting screw carried by the piston, a screw threaded sleeve carried by and adjustable upon said screw, a stem carried by said sleeve and extending outwardly through the slot in said cylinder, and an indicator on the outer end of the stem.

In testimony whereof I affix my signature.

THOMAS F. KEARNEY.